US009860773B2

(12) United States Patent
Roessel et al.

(10) Patent No.: US 9,860,773 B2
(45) Date of Patent: Jan. 2, 2018

(54) SYSTEMS, METHODS, AND DEVICES TO PREVENT OVERHEATING FROM HIGH PERFORMANCE DEVICE CONFIGURATIONS IN WIRELESS NETWORKS

(71) Applicant: INTEL IP CORPORATION, Santa Clara, CA (US)

(72) Inventors: Sabine Roessel, Munich (DE); Christian Pacha, Grasbrunn (DE); Christian Drewes, Germering (DE); Youn Hyoung Heo, Seoul (KR); Kenan Kocagoez, Nuremberg (DE); Ralph Hasholzner, Munich (DE); Georg Walter, Sauerlach (DE)

(73) Assignee: INTEL IP CORPORATION, Santa Clara, CA (US)

( * ) Notice: Subject to any disclaimer, the term of this patent is extended or adjusted under 35 U.S.C. 154(b) by 41 days.

(21) Appl. No.: 14/961,578

(22) Filed: Dec. 7, 2015

(65) Prior Publication Data
US 2017/0164220 A1    Jun. 8, 2017

(51) Int. Cl.
 *H04M 3/00* (2006.01)
 *H04W 24/04* (2009.01)
 (Continued)

(52) U.S. Cl.
CPC .......... *H04W 24/04* (2013.01); *H04B 1/036* (2013.01); *H04M 3/42* (2013.01); *H04W 24/02* (2013.01);
 (Continued)

(58) Field of Classification Search
USPC ..... 455/418–420, 452.2, 423–424, 522–523; 370/232–235, 252–253, 332–334
See application file for complete search history.

(56) References Cited

U.S. PATENT DOCUMENTS 6,574,209 B1 * 6/2003 Kosaka ............... H03G 3/3036
 370/342
7,860,018 B2 * 12/2010 Raith .................... H04B 1/036
 370/252
(Continued)

FOREIGN PATENT DOCUMENTS

EP    2819481 A1    12/2014

OTHER PUBLICATIONS

PCT/US2016/058041, International Search Report and Written Opinion, dated Dec. 19, 2016, 10 pages.
Qualcomm Incorporated, "Limitations of current UE E-UTRA capability handling", R2-144118, 3GPP TSG-RAN WG2 Meeting #87bis, Shanghai, P.R. China, Agenda Item 7.6.1, Oct. 6-10, 2014, 2 pages.

*Primary Examiner* — Dai A Phuong
(74) *Attorney, Agent, or Firm* — Stoel Rives LLP

(57) ABSTRACT

A thermal finite-state-automaton includes system states and transitions between the system states. The system states may be based on a combination of network parameters for communicating through the wireless communication system and UE processing parameters. A default state is for operation of the UE at a sustainable performance configuration level for the network parameters and the UE processing parameters to maintain a UE temperature below a first temperature threshold. A high state is for operation of the UE during up to a maximum time duration at a peak performance configuration level for the network parameters and the UE processing parameters. A recovery state is for operation of the UE during at least a minimum time duration at a reduced performance configuration level for the network parameters and the UE processing parameters. An emergency shutdown state is triggerable by the UE temperature exceeding a second temperature threshold.

24 Claims, 8 Drawing Sheets

(51) Int. Cl.
*H04M 3/42* (2006.01)
*H04W 24/02* (2009.01)
*H04B 1/036* (2006.01)
*H04W 52/02* (2009.01)

(52) U.S. Cl.
CPC .... *H04W 52/0261* (2013.01); *H04M 2250/12* (2013.01)

(56) References Cited

U.S. PATENT DOCUMENTS

| | | | |
|---|---|---|---|
| 8,477,041 B2* | 7/2013 | Hu | H01M 8/04007 320/132 |
| 2003/0142637 A1* | 7/2003 | Khawer | H04W 52/54 370/318 |
| 2012/0075992 A1* | 3/2012 | Shahidi | H04B 1/036 370/235 |
| 2013/0078966 A1* | 3/2013 | Chang | H04W 4/16 455/414.1 |
| 2015/0099472 A1* | 4/2015 | Ickovic | H04B 1/385 455/66.1 |
| 2016/0156766 A1* | 6/2016 | Nishikawa | H04M 1/72533 455/420 |
| 2017/0025903 A1* | 1/2017 | Song | H02J 50/40 |
| 2017/0177065 A1* | 6/2017 | Rajwan | G06F 1/3253 |

* cited by examiner

SYSTEMS, METHODS, AND DEVICES TO PREVENT OVERHEATING FROM HIGH PERFORMANCE DEVICE CONFIGURATIONS IN WIRELESS NETWORKS

TECHNICAL FIELD

The present disclosure relates to wireless communication systems, and more particularly relates to signaling to prevent overheating from high performance device configurations.

BACKGROUND INFORMATION

Wireless mobile communication technology uses various standards and protocols to transmit data between a base station and a wireless communication device. Wireless wide area network (WWAN) communication system standards and protocols can include, for example, the 3rd Generation Partnership Project (3GPP) long term evolution (LTE), and the Institute of Electrical and Electronics Engineers (IEEE) 802.16 standard, which is commonly known to industry groups as worldwide interoperability for microwave access (WiMAX). Wireless local area network (WLAN) can include, for example, the IEEE 802.11 standard, which is commonly known to industry groups as Wi-Fi. Other WWAN and WLAN standards and protocols are also known.

In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNBs and may communicate with a plurality of UEs. An evolved packet core (EPC) may communicatively couple the E-UTRAN to an external network, such as the Internet. LTE networks include radio access technologies (RATs) and core radio network architecture that can provide high data rate, low latency, packet optimization, and improved system capacity and coverage.

DETAILED DESCRIPTION OF PREFERRED EMBODIMENTS

Figure 1:
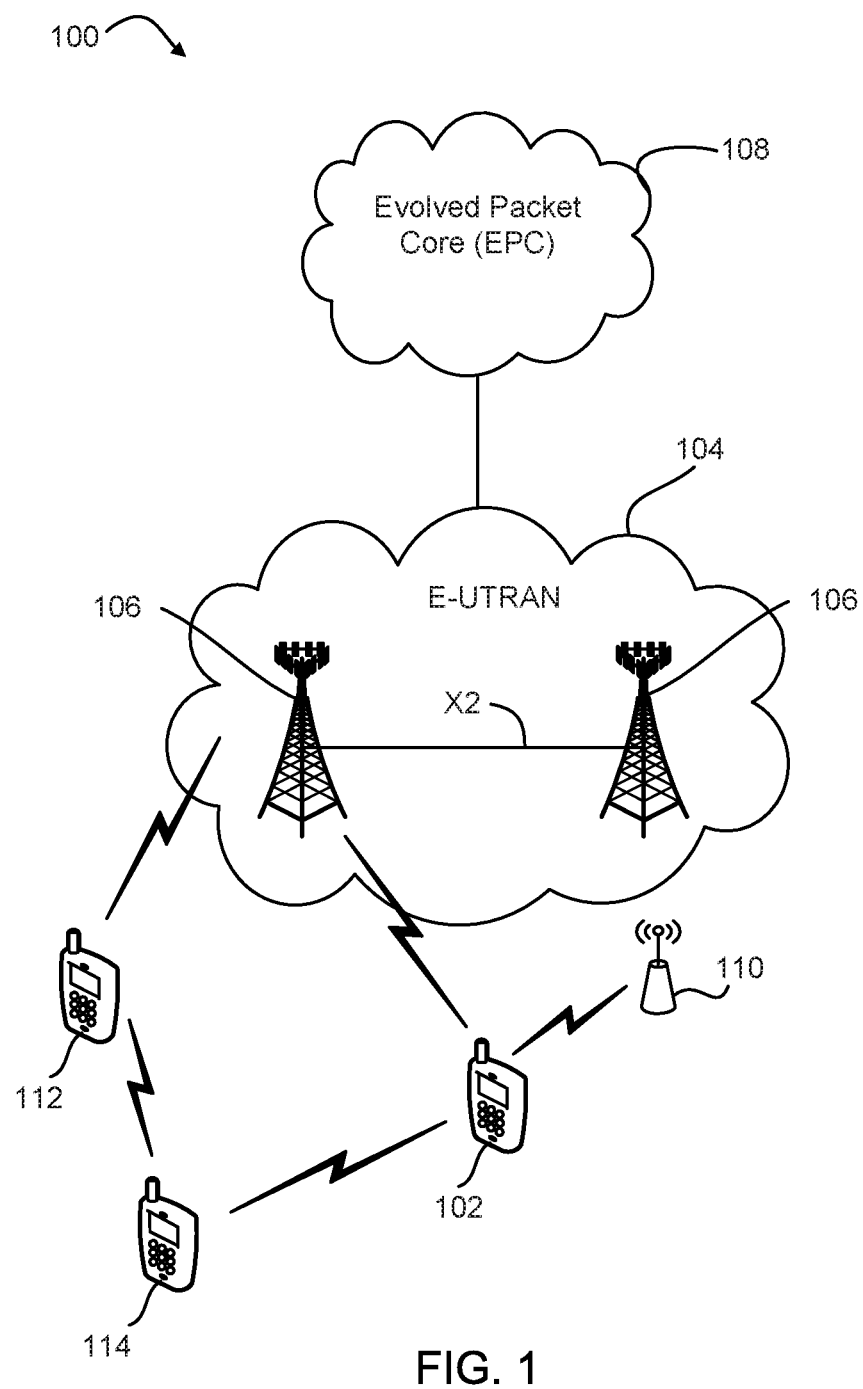
FIG. 1 is a schematic diagram illustrating a communication system according to certain embodiments.

Certain embodiments disclosed herein provide a set of statically signalled UE capability profiles as well as a network-device interaction scheme to solve thermal emergency situations and to drive network-device interaction such that thermal emergency situations are avoided. Certain such embodiments also provide a subset of network-device interaction schemes to become part of the UE category (Cat) definition in conformance test requirements. A set of techniques and network-device interaction schemes are used to avoid or to recover from thermal and power consumption issues, and a subset of those network-device interaction schemes may be used as part of conformance test requirements for LTE UE categories above Cat-7.

To provide higher data rates and increased capacity, 3GPP has introduced demanding physical layer (PHY) features in both downlink (DL) and uplink (UL) wireless communications. With carrier aggregation (CA) or dual connectivity for up to four DL carriers and up to two UL carriers, and with demanding PHY features like multiple input multiple output (MIMO) and advanced interference cancellation, self-heating (e.g., intrinsic power dissipation generates a temperature increase on the die of about 15° C. to 80° C.) and potentially overheating of a device may be expected if the device is persistently operated by the network in high or highest performance device configurations. During high workload integrated circuit (IC) operation, the intrinsic power dissipation of the IC (e.g., baseband IC or integrated system on chip (SoC)) may reach maximum levels of about 1 Watt and beyond. The self-heating may approach thermal equilibrium on time constants of about 20 seconds to 120 seconds (depending on various technology, design, package and system configurations) and is therefore relevant for the characteristic operating times of high performance use cases.

Test use cases operate a UE at its maximum processing capability, i.e., full exploitation of CA, full allocation in frequency domain (e.g., 100% physical resource blocks (PRBs) allocation), during a period of minutes. Moreover, burst DL peak data rates may be repeatedly created. For example, a field test case may perform 20 iterations in a row of at least a 100 megabyte (MB) file download at a maximum of five seconds between each download.

Generally, the maximum processing capability of a device is expressed in its UE category. For example, a Cat-11 UE's maximum processing capability in DL is 600 Mbps. Highest performance device configurations of a Cat-11 UE include: four DL CA with 80 MHz spectrum aggregated with 2×2 MIMO and two DL CA with 40 MHz aggregated with 4×4 MIMO on both carriers. Network vendor interoperability tests (NV-IOT) may drive a device for several minutes at its aggregated maximum DL and UL throughput to prove the UE category. If overheating becomes a problem in NV-IOT, the device fails conformance to UE categories at or above Cat-7 (300 Mbps DL and 100 Mbps UL).

Real-world use may also imply full allocation both in frequency and in time at the highest possible throughput for a long time duration as well as in long periods of repeated bursts. For example, download of a one gigabyte (GB) file at 100 megabits per second (Mbps) throughput in a wireless network (e.g., for a Cat-9 device supporting 450 Mbps peak throughput in a three DL CA configuration with 2×2 MIMO) takes 80 seconds. Depending on the UE's radio conditions (e.g., position in the cell) as well as on the cell load, 100 Mbps throughput over 80 seconds is likely achieved by a (mostly) full allocation in frequency and in time. 100 Mbps might also be a resulting throughput under very good radio conditions if the network needs to schedule multiple UE's in a cell and can only provide partial allocation in frequency and in time per UE. In certain situations, however, only under excellent radio conditions and with full allocation in frequency and time may the device reach its DL peak data rate such that one GB could be downloaded within 18 seconds.

Whether or not a UE might be driven into thermal and/or power consumption problems may depend on the service (e.g., file download, streaming, amount of data, etc.) requested by the user and on how (e.g., length of download burst, length of recovery phase, repetition of download bursts, etc.) the network meets the service request. Further, for extreme UE categories like Cat-9 or Cat-11, it may be impossible to conform to the UE categories under typical test configurations without driving the UE into thermal and/or power consumption issues.

There are 3GPP-independent methods of preventing overheating in emergency cases that involve, for example, switching off the display or autonomously declining capabilities related to operating the LTE air interface, i.e., DL or UL throttling or shut-down. However, a device that autonomously declines capabilities related to LTE operation is unpredictable in its behavior and will likely lead to noncompliance. For example, a UE that acts autonomously may fail to comply with hybrid automatic repeat request (HARQ) acknowledgement/negative acknowledgement (ACK/NACK) processes or to accept secondary carrier allocations, which may negatively impact network operation or cause the UE to lose network connection. The network may respond (based on intelligent tracking on the network side) by eventually banning the non-compliant UE from high or highest performance device configurations in the future.

Thus, according to certain embodiments, a set of techniques and network-device interaction schemes are provided to resolve thermal and power consumption emergency situations and to drive network-device interaction to avoid such emergency situations. The set of techniques addresses a trade-off between robust IC operation with respect to thermal restrictions and achieving maximum or close to the maximum throughput with minimal disturbance of network operation. In addition, or in other embodiments, a subset of network-device interaction schemes may be used as part of a UE category definition for conformance test requirements.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

FIG. 1 illustrates an example embodiment of a wireless communication network 100 for providing communication services to a UE 102. The wireless communication network 100 includes an E-UTRAN 104, which includes eNBs 106, and an evolved packet core (EPC) 108. The UE 102 may include any type of communications and/or computing device. Example UEs 102 include phones, smartphones, personal digital assistants (PDAs), tablet computers, notebook computers, ultrabook computers, and the like. The UE 102 may include a plurality of applications installed and running on the UE 102 which may periodically communicate data over the E-UTRAN 104 and/or EPC 108. The UE 102 may include devices configured to communicate using a 3GPP standard such as universal mobile telecommunication system (UMTS), LTE, LTE-Advanced (LTE-A), or the like. In some embodiments, the UE 102 may include a mobile wireless device configured to communicate based on any other wireless communication standard.

The E-UTRAN 104 is configured to provide wireless data access to the UE 102 and a plurality of other wireless mobile devices. The E-UTRAN 104 provides wireless data, voice, and/or other communications available through the EPC 108 to the UE 102, including the plurality of applications installed on the UE 102. In one embodiment, the E-UTRAN 104 operates according to a wireless protocol, such as a wireless protocol that the UE 102 is capable of using. The eNBs 106 may implement transmission point and RNC functions. The eNBs 106 are configured to communicate with each other via an X2 interface, as depicted.

In addition to communicating with the E-UTRAN 104 (e.g., WWAN), the UE 102 may communicate directly with other wireless communication devices. For example, the UE 102 may wirelessly communicate with a WLAN (e.g., Wi-Fi) access point (AP) 110. The UE 102 may also wirelessly communicate directly with other UEs 112, 114, which may be referred to herein as device-to-device (D2D) communication, direct communication, one-to-one communication, or peer-to-peer (P2P) communication. D2D communication may be used, for example, to form an ad-hoc network among the UEs 102, 112, 114. D2D communications are of interest due to their ability to reduce load on a core network or a RAN, increase data rates due to direct and short communication paths, provide public safety communication paths, and provide other functionality.

UE capability signaling may allow the UE 102 to have multiple feature concurrency personalities. The eNB 106 or the UE 102 may choose from among these personalities depending on quality of service (QoS) needs, eNB capability, radio condition, etc. Generally, changes in the UE's E-UTRAN capabilities require the UE 102 to detach and then re-attach to the eNB 106. However, detachment and reattachment reconfiguration processes may be too slow for thermal emergency situations. Thus, in certain embodiments, a thermal automaton provides efficient thermal management of the UE 102. An automaton may also be referred to herein as a finite-state machine, a finite-state automaton, or simply a state machine. The thermal automaton provides a set of thermal system states based on key-relevant device, network, and SoC and/or IC parameters.

In certain embodiments, the UE 102 includes a first thermal automaton and one or more nodes in the wireless communication network 100 maintain a second thermal automaton that tracks or estimates the thermal state of the UE 102. For example, the eNB 106 connected to the UE 102 may include the second automaton. In other embodiments, the AP 110 or the UE 112 may include the second automaton. In yet other embodiments, the second automaton may be distributed across two or more nodes such as the eNB 106, the AP 110, the UE 112, and/or the UE 114.

Signaling may be provided to allow one or more nodes in the wireless communication network 100 to track or estimate the thermal state of the UE 102. For example, certain embodiments provide UE capability parameters and UE capability profiles (e.g., UE profile type for a recovery state) to coordinate transitions between system states in the thermal automaton. Certain such embodiments provide a mapping of the thermal system states to the UE capability parameters and UE capability profiles. As discussed below, various signaling methods between the UE 102 and the wireless communication network 100 may be used to indicate a certain profile, indicate how to apply a certain profile, alert emergency state, or signal next steps in the thermal automaton. In addition, or in other embodiments, the thermal automaton may use fixed or semi-persistent thermal sequences to avoid emergency situations in extreme use cases, such as high definition television (HDTV) real-time streaming.

Figure 2:
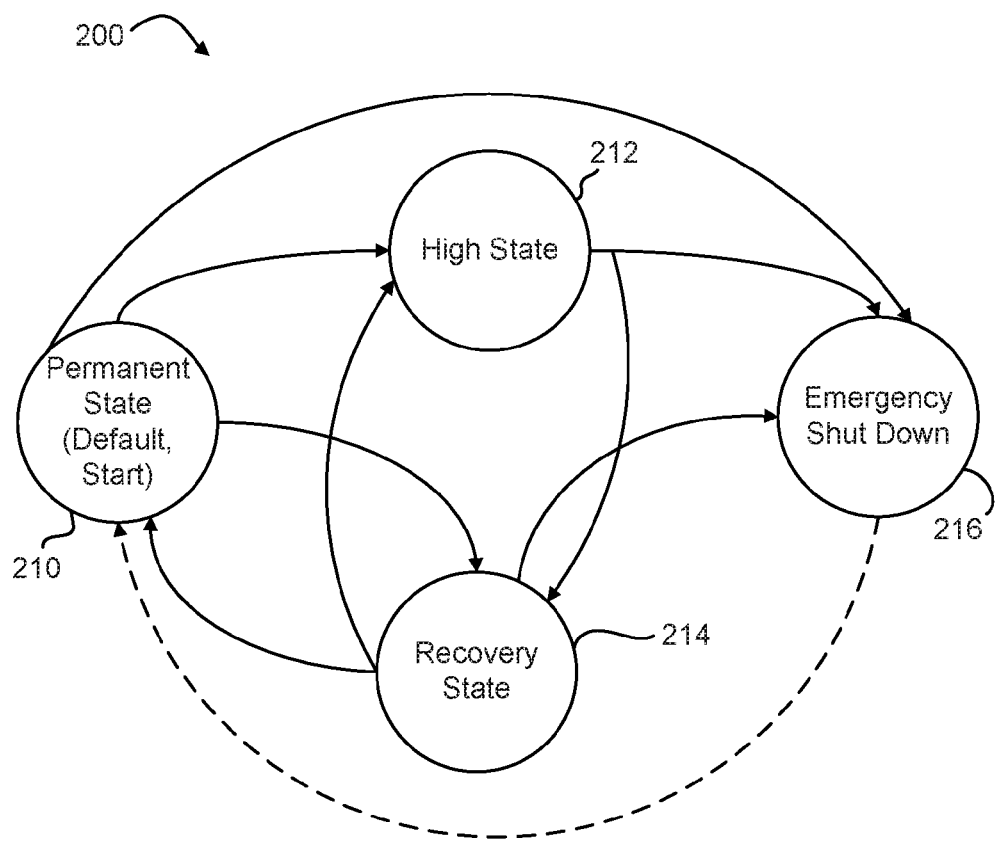
FIG. 2 is a block diagram illustrating a thermal automaton according to one embodiment.

FIG. 2 is a block diagram illustrating a thermal automaton 200 according to one embodiment. The thermal automaton 200 includes multiple thermal system states and predefined transitions between the thermal system states. In this example, the thermal automaton 200 includes a permanent state (also referred to herein as a default state or start state) 210, a high state 212, a recovery state 214, and an emergency shutdown state. The thermal automaton 200 in FIG. 2 is simplified in that, for example, no transitions from idle mode to radio resource control (RRC) connected mode, or transitions from any mode to off, are shown. The thermal automaton 200 transitions between the four illustrated states depending on predefined key thermal SoC parameters. The thermal automaton 200, which is a finite state machine, provides a flexible adaptation to the specific UE. For example, the threshold values for the transition (e.g., at >110° C. high state 212 to emergency shutdown state 216 is initiated) can be specified by firmware (e.g., post-silicon adaption).

Each state in the thermal automaton 200 is mapped to a combination of network parameters (e.g., modulation types, coding schemes, categories) and UE processing parameters. The UE processing parameters include, in certain embodiments, SoC thermal key parameters such as system and ambient temperatures, currents, SoC status. The system temperature of the SoC may include, for example, the junction temperature or the printed circuit board (PCB) temperature. The junction temperature is the operating temperature of the actual semiconductor in the UE's processor(s) or SoC. The SoC status may include, for example, frequency, activated power domains, voltage levels, chip process information, and thermal budget. Mapping thermal states to combinations of network parameters and UE processing parameters provides a representation of the UE to the network that can be used to track and predict thermal states.

The permanent state 210 (i.e., default state) is an operation mode that allows for operating permanently and sustainably at a certain maximum performance device configuration level (e.g., Cat-4 performance of 150 Mbps DL and 50 Mbps UL) for a given ambient temperature. The actual UE configuration in the permanent state 210 depends on how the network has configured the device. The permanent state 210 may represent the profile that is recommended to be configured by the network as a default configuration.

Figure 3A:
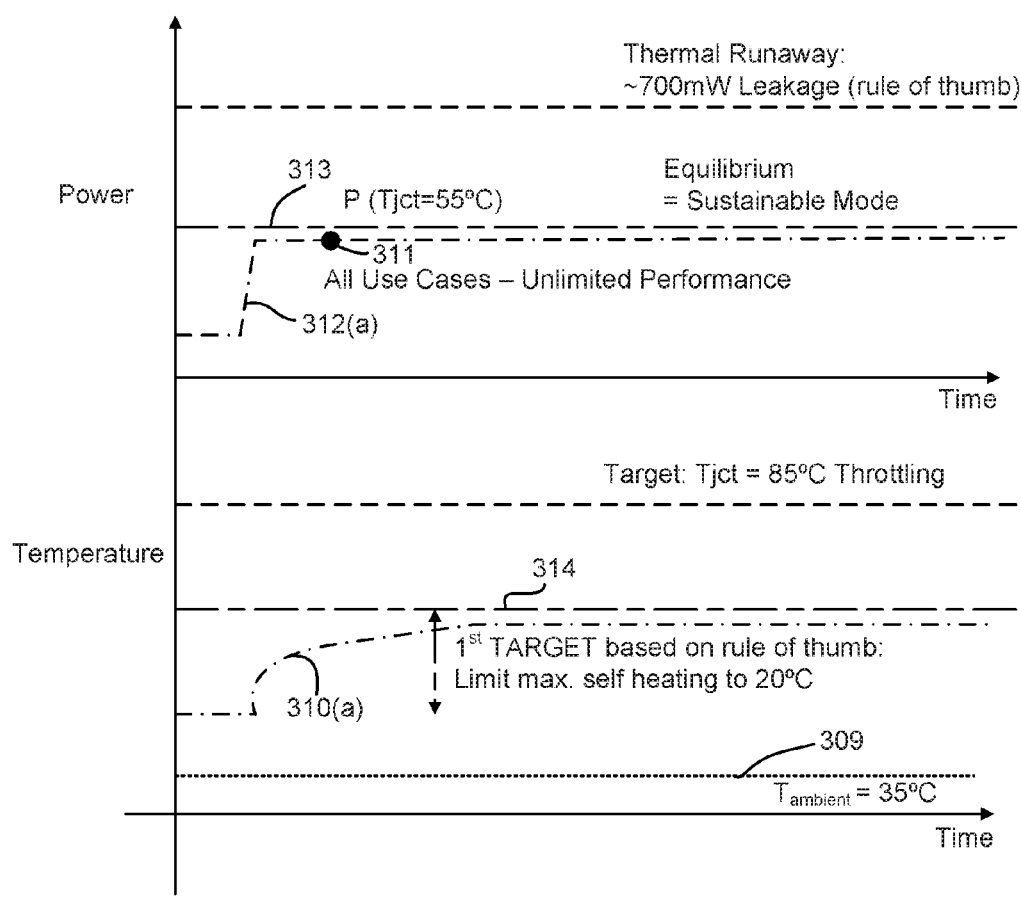
FIG. 3A illustrates an example temperature curve and an example power curve for a UE operating in a permanent state according to one embodiment.

For example, FIG. 3A illustrates an example temperature curve 310(*a*) and an example power curve 312(*a*) for a UE operating in the permanent state 210 for an ambient temperature 309 of 35° C. The values shown in FIG. 3A are provided by way of example only and not by limitation. In the example shown in FIG. 3A, the UE's processor(s) (e.g., baseband and/or application processors) or SoC operate at a power level 311 below an equilibrium or sustainable power level threshold 313 (Psust) such that the UE's junction temperature (Tjct) does not exceed a first target temperature threshold 314. In this example, the first target temperature threshold 314 is based on a "rule of thumb" of limiting maximum self-heating of the UE's junction temperature (Tjct) to 20° C. (i.e., above the ambient temperature).

The high state 212 allows for a burst-like peak performance operation of the UE. Mapping the high state 212 to network parameters and UE processing parameters includes, for a ambient temperature (e.g. 55° C.), determining a configurable peak processing level (e.g., based on a UE category or a more complex UE capability profile), and determining a configurable maximum time that the UE may remain in the high state 212 (e.g., 20 seconds) based on the highest-performance device configuration (e.g., the UE category).

Figure 3B:
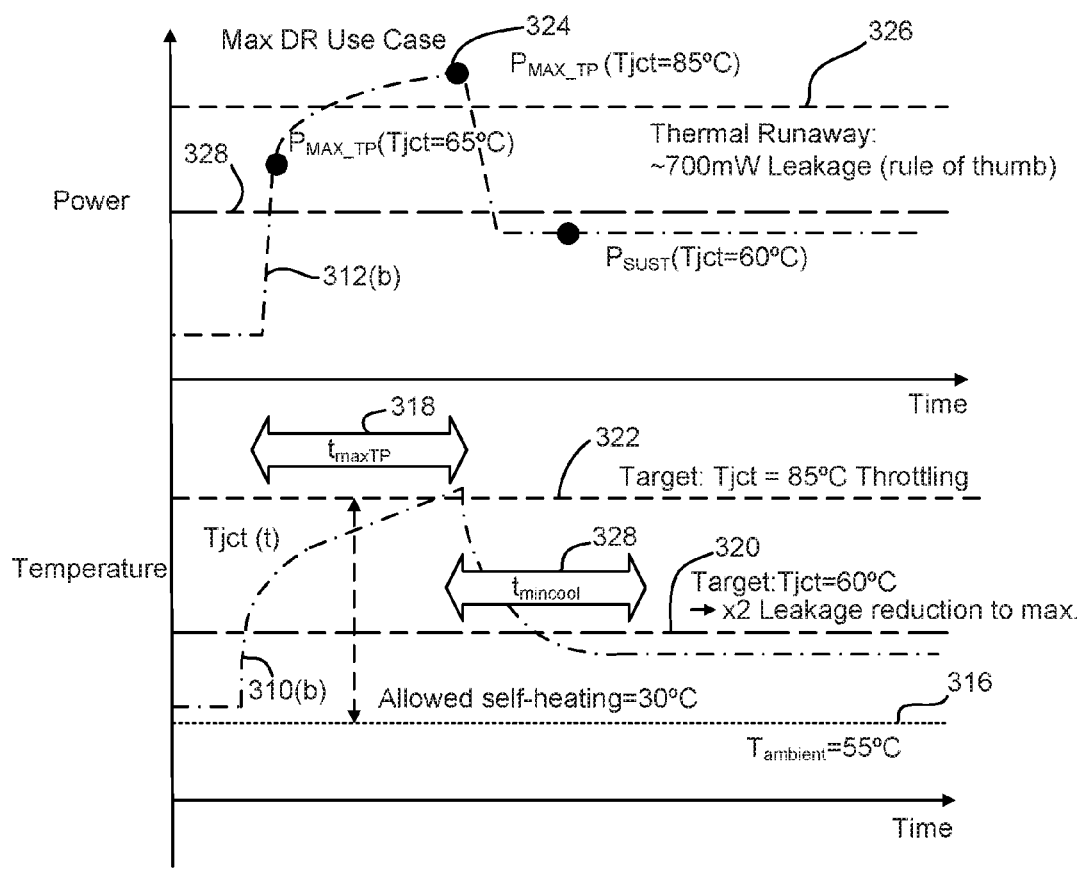
FIG. 3B illustrates an example temperature curve and an example power curve for a UE operating in a high state according to one embodiment.

For example, FIG. 3B illustrates an example temperature curve 310(*b*) and an example power curve 312(*b*) for a UE operating in the high state 212 for a selected ambient temperature 316 of 55° C. The values shown in FIG. 3B are provided by way of example only and not by limitation. In this example, the UE's junction temperature (Tjct) is allowed 30° C. of self-heating during a configurable maximum time $T_{maxTP}$ 318 so as to exceed a first target temperature threshold 320 of 60° C. for sustainable operation and arrive at a second target temperature threshold 322 of 85° C., which corresponds to a peak power level ($P_{MAX\_TP}$) 324 for a maximum data rate (DR) use case. The peak power level ($P_{MAX\_TP}$) 324 for the maximum DR use case may exceed a thermal runaway threshold, which in this example corresponds to about 700 mW leakage (per a "rule of thumb" for a particular implementation).

When the UE's junction temperature (Tjct) reaches the second target temperature threshold 322, throttling occurs and the UE moves from the high state 212 to the recovery state 214 in the thermal automaton 200. In certain situations, a temperature threshold (such as the second target temperature threshold 322) may be reached when the UE is in the permanent state 210 that causes the UE to transition from the permanent state 210 directly to the recovery state 214 (e.g., when the ambient temperature is higher than expected for the UE configuration). In the recovery state 214, as shown in FIG. 3B, operation of the UE's processor(s) or SoC changes to below an equilibrium or sustainable power level threshold 328 (Psust) such that the UE's junction temperature (Tjct) returns below the first target temperature threshold 320. The UE remains in the recovery state 214 for a configurable minimum cooling time ($t_{mincool}$) 328 (e.g., 60 seconds) during which the UE operates at a configurable low processing level (e.g., based on a UE category or a more elaborately reduced UE capability profile). In the recovery state 214, the UE operates at a lower performance mode while cooling down until it is safe to return to the next high state 212 or permanent state 210. A recovery profile may be configured to allow for voice-calls and other basic operations such as simple browsing and/or streaming, if the UE thermal characteristics so allow.

As shown in FIG. 2, the thermal automaton 200 also includes an emergency shutdown state 216 for accidental heating beyond a configurable junction temperature threshold (e.g., 110° C.). In the emergency shutdown state 216, the network expects that the UE has shut down and has to come back by regular registration, attach, and connect procedures. The UE may then transition from the emergency shutdown state 216 to the start state or permanent state 210. In certain embodiments, transition to the emergency shutdown state is possible from all system states.

In certain embodiments, the period of time that the UE remains in a thermal state may be on the order of seconds or tens of seconds. The period of time that the UE remains in a sleep or inactive mode during connected mode discontinuous reception (cDRX) is typically measured in tens of milliseconds or milliseconds. Thus, such embodiments do not exclude coexistence with cDRX.

Certain embodiments configure thermal states based on UE capability profiles. To enable thermal management of the UE, the UE specifies one or more UE capability profiles to the network within an attach UE capability signaling procedure. In one embodiment, the UE specifies at least three different UE thermal state profiles, which include a high state capability profile, a permanent state capability profile, and a recovery state capability profile. To provide an accurate UE capability profile for a given UE thermal state, a reasonable set of preconfigured data processing modes may be reused. Any other method may also be established for an upfront definition of the thermal UE states.

In certain embodiments, the UE thermal states are configurable with additional parameters. One or more of the UE thermal state specifications may include additional configuration parameters such as configurable peak processing level and configurable time periods and power or temperature thresholds, as discussed above. For example, a Cat-12 device's high state may be specified upfront to be as follows: 4 DL CA+network-assisted interference cancellation and suppression (NAICS)–4×4 MIMO–DL coordinated multi-point (CoMP) transmission and/or reception+an additional configurable parameter: maximum time in high state=20 seconds. Analogously, the other UE thermal states may be specified upfront using the parameters described above.

Certain embodiments provide network-device interaction. The thermal automaton in such embodiments is a tool to standardize network-device interaction for thermal management maintained both in the UE as well as in the network. The time scale of changes to the thermal situation of the UE may be, for example, on the order of several 100's of milliseconds to several 10's of seconds. The decision of whether and to which thermal state the UE transitions, by 3GPP standard, is taken by the network through reconfigurations. In general, the time scale for network-triggered state transitions is on the order of several 10's of milliseconds wherein the network first decides to submit the reconfiguration command, and then the UE by the 3GPP standard completes the reconfiguration within 20 milliseconds.

Certain embodiments include UE-autonomous transitions in the thermal automaton without explicit instructions or permission from the eNB. Ultimately, there may be urgency or emergency cases that require UE-autonomous state transitions. In certain embodiments, the time scale for UE-autonomous transitions in emergency situations is less than 10 milliseconds. In addition, or in other embodiments, the eNB and UE agree upon a configurable but defined set of UE-autonomous state transitions that have the consent of the network.

Figure 4:
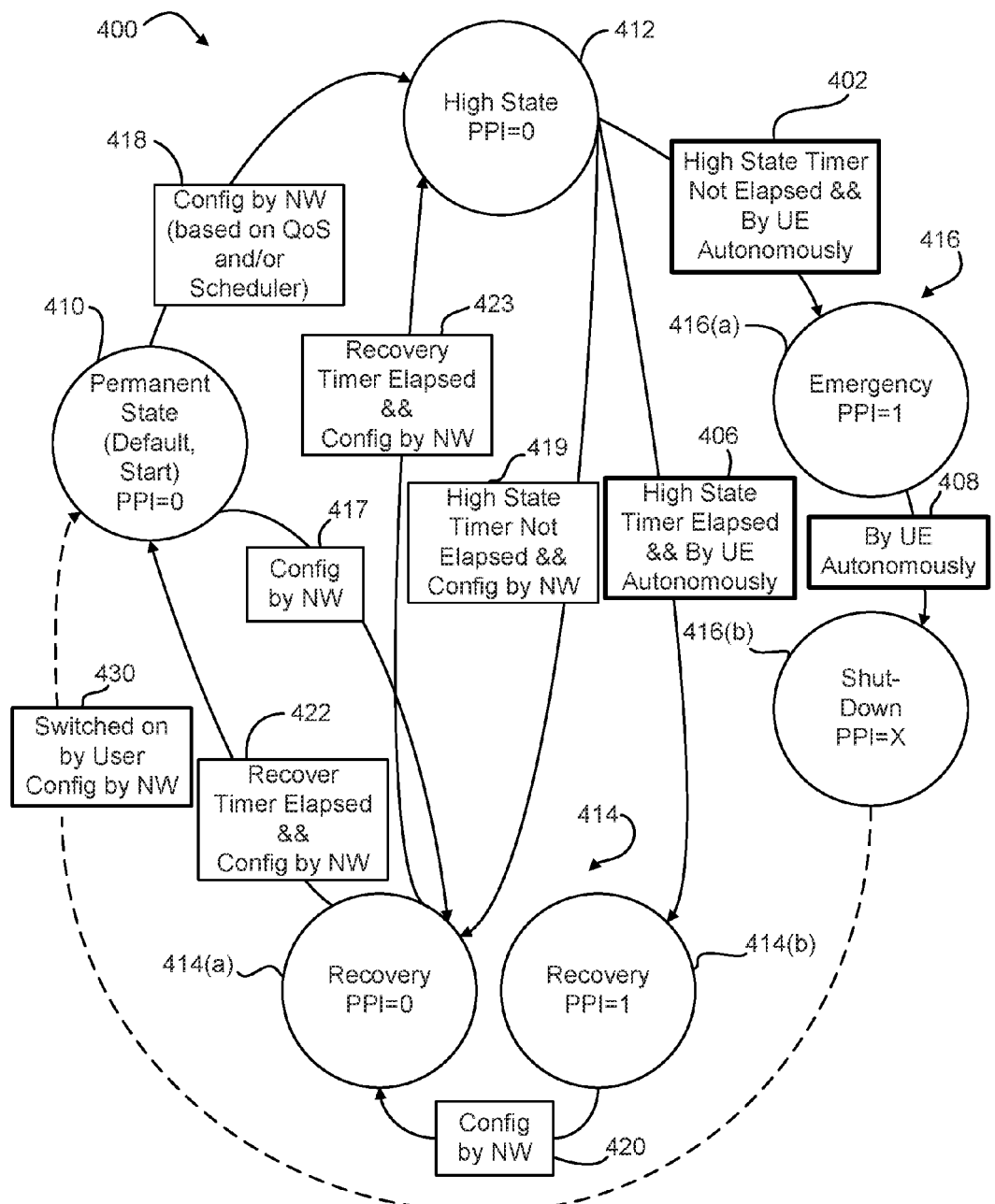
FIG. 4 is a block diagram illustrating a thermal automaton using a single bit to signal state transitions according to one embodiment.

In certain embodiments, the UE signals to the network its autonomous transition out of the high state via a single bit so as to reduce or minimize signaling between the network and the UE. For example, FIG. 4 is a block diagram illustrating a thermal automaton 400 using a single bit to signal state transitions according to one embodiment. In the example of FIG. 4, the single bit is an LTE power preference indicator (PPI) bit that is set according to thermal state characteristics. Persons skilled in the art will recognize from the disclosure herein that other signaling bits may also be used. For illustrative purposes, thicker lines are used to highlight UE-autonomous transitions 402, 406, 408.

The thermal automaton 200 includes a permanent state 410, a high state 412, a recovery state 414 represented by a recovery state 414(*a*) with PPI=0 and a recovery state 414(*b*) with PPI=1, and an emergency shutdown state 416 represented by an emergency state 416(*a*) and a shutdown state 416(*b*). By setting the PPI bit in the destination state and a pre-condition (e.g., whether or not a high state timer is elapsed), the network knows whether the UE is ready to be configured for the recovery state 414 or whether the UE has autonomously shutdown.

In the permanent state 410 the UE sets the PPI=0. A transition 417 from the permanent state 410 to the recovery state 414(*a*) with PPI=0 may be configured by the network (NW). Or, a transition 418 from the permanent state 410 to the high state 412 may configured by the network based on, for example, QoS requirements and/or scheduler decisions.

As indicated by transition 419, if PPI=0 and the high state timer has not elapsed, the network may configure the UE to enter the recovery state 414(*a*) with PPI=0 (e.g., when maximum or high performance is no longer needed). As indicated by the transition 402, when the UE sets the PPI=1 before the high state timer has elapsed, the network knows that the UE has transitioned to the emergency state 416(*a*) and will shut down autonomously, as shown by transition 408. If the UE has shut down (i.e., entered the shut-down state 416(*b*) where PPI=X to indicate its value does not matter), the UE may eventually be switched-on (e.g., by a user) and configured by the network in transition 430 to enter the permanent state 410.

As indicated by the transition 406, when the high state timer has elapsed and the network has not reconfigured the UE (in time), the UE autonomously transitions to the recovery state 414(*b*) while signaling PPI=1. Thus the network knows that there is a potential loss of data until the UE has been properly configured by the network in transition 420 to the recovery state 414(*a*) and has signaled PPI=0.

If the UE is in the recovery state 414(*a*) with PPI=0, the network may reconfigure the UE to another state (i.e., either the permanent state 410 via transition 422 or the high state 412 via transition 423) as soon as a recovery timer has elapsed. The high state timer value and/or the recovery timer value are configurable and/or may depend on implementation-dependent conditions. Further, the device-autonomous transitions to the emergency state 416(*a*) or the recovery state 414(*b*) with PPI=1 may be initiated by the UE based on an implementation-dependent decision automaton that may take the ambient temperature or any other device condition into account.

Figure 5:
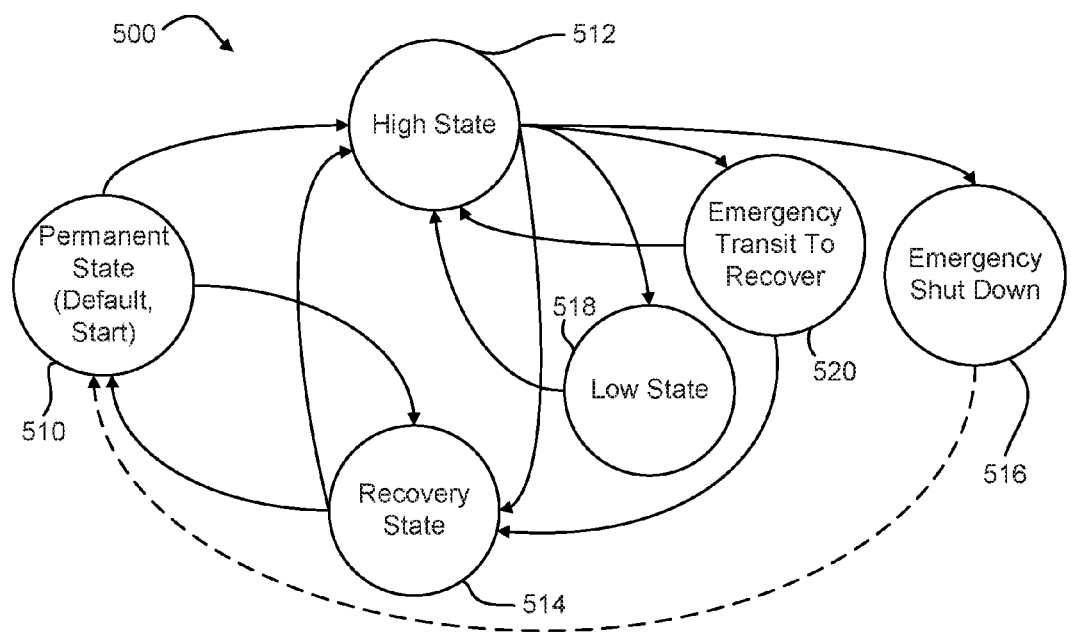
FIG. 5 is a block diagram illustrating a thermal automaton including additional thermal states according to one embodiment.

In other embodiments, the UE signals to the network its autonomous transitions out of the high state using a plurality of bits. In one embodiment, for example, the UE may signal its thermal state via a PPI word. Thus, the thermal automaton may be extended with more elaborate states. For example, FIG. 5 is a block diagram illustrating a thermal automaton 500 including additional thermal states according to one embodiment. In addition to a permanent state 510, a high state 512, a recovery state 514, and an emergency shutdown state 516, such as those states discussed above, the example thermal automaton 500 shown in FIG. 5 includes a low state for regularly alternating with the high state 512. In addition, or in other embodiments, the thermal automaton 500 may include a various emergency states, such as an emergency transit to recover state 520. The emergency transit to recover state 520 may, for example, be an extremely extended connected mode DRX and discontinuous transmission (DTX) to enable cool-down for a configurable period of time until the network may reconfigure a profile for the recovery state 514. For the thermal automaton 500 shown in FIG. 5, a plurality of PPI bits are used to signal to the network to which target state the UE has transitioned.

In addition, or in other embodiments, user input may be used to trigger thermal state transitions. Such an embodiment may intercept the thermal automaton by attention (AT) commands. For example: when being in a lowest performance recovery state, the UE may provide an "Emergency Call Button" AT command (e.g., with a "risk to unrepairable damage your phone") that allows the user to intercept the thermal automaton.

In certain embodiments, the network-device system may perform thermal automaton state transitions based on events (e.g., reaching thermal thresholds), a selected application for execution by the UE, and or a selected service to be provided by the network. In addition, or in other embodiments, a pre-scheduled thermal state sequence and/or a large-scale DTX may be used. For example, systems and methods may allow for a specification of fixed semi-persistent thermal sequences to avoid emergency situations in extreme applications, such as HDTV streaming. Further, as shown in FIG. 5 the high state 512 and low state 514 can be used for a regular alternating pattern that allows the network to apply burst-wise down-streaming of, for example, a real-time high definition (HD) video or a large data file both without losses in QoS and without causing overheating.

In certain embodiments, a subset of network-device interaction schemes is provided as part of the conformance test requirements for UE categories above, e.g., Cat-7. For example, the RAN2 UE category definitions may be amended above, e.g., Cat-7 with conformance test conditions that, for example, limit the time and define further conditions under which the device can be operated with the highest possible peak performance the category definition allows for as well as for how long the device is allowed to recover from a maximum high state period. The category definitions may also be amended to, for example, limit the size of file download and define further conditions under which the device can be operated with the highest possible peak performance the category definition allows for as well as for how long the device is allowed to recover from a maximum high state period.

Figure 6:
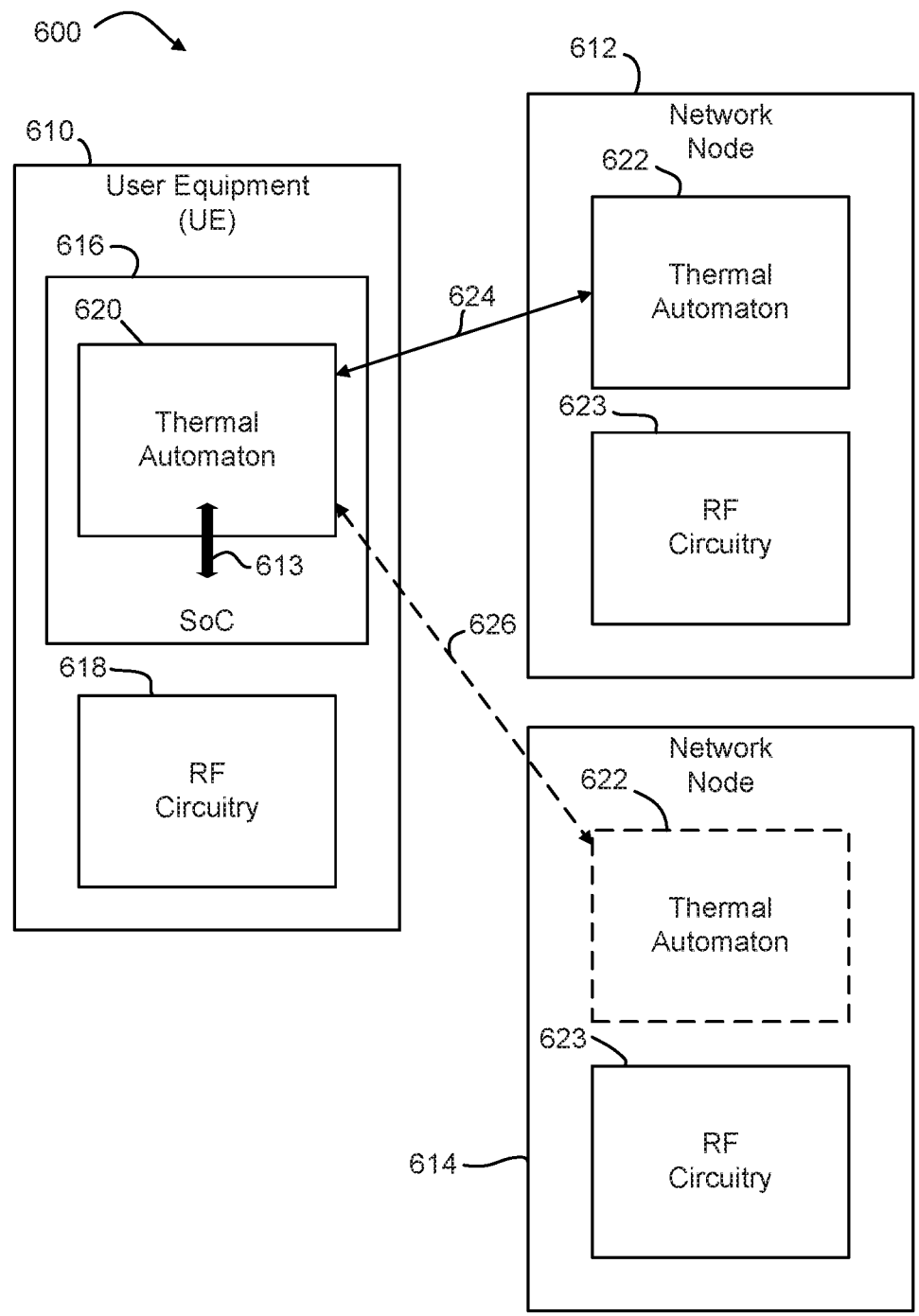
FIG. 6 is a block diagram of a wireless network-device system including a UE and network nodes according to one embodiment.

FIG. 6 is a block diagram of a wireless network-device system 600 including a UE 610 and network nodes 612, 614 according to one embodiment. The UE 1400 may be capable of performing the functions of any of the UEs disclosed herein. Further, the network nodes 612, 614 may comprise an eNB, a WLAN AP, or another UE (e.g., in D2D communication with the UE 610). The UE 610 includes, among other circuitry and components, a SoC 616 and radio frequency (RF) circuitry 618. The RF circuitry 618 may be configured for wireless communication with one or more RAT types. The SoC 616 includes a thermal automaton 620. The SoC 616 and the thermal automaton 620 may include logic, at least a portion of which includes circuitry, configured to perform the functions of any thermal automaton disclosed herein. The thermal automaton 620 exchanges data 613 with the SoC 616. For example, the thermal automaton 620 may receive data for ambient temperature, system temperature of the SoC 616 (e.g., junction or PCB temperature), UE front or back skin temperature, UE internal case temperature (e.g., 1 mm distance from the PCB), processing frequency of the SoC 616, number of activated power domains in the SoC 616, SoC current levels, SoC voltage levels, SoC chip process information, and SoC thermal budget.

The network node 612 also includes a thermal automaton 622 and RF circuitry 623 for wirelessly communicating with the UE 610. The thermal automaton 622 may include a computer readable storage medium comprising computer executable instructions that cause a processor to, when executed, perform the network functions and configurations described herein. As disclosed herein, signaling 624 may be used between the UE 610 and the network node 612 to assist the thermal automaton's to perform their respective functions. In certain embodiments, the network may distribute its functions associated with the thermal automaton 622 among a plurality of the network nodes 612, 614. In such embodiments, each network node 612, 614 providing functions associated with the thermal automaton 622 may exchange signaling 624, 626 with the UE 610.

As disclosed herein, the thermal automatons 620, 622 include multiple thermal system states and predefined but configurable transitions between these system states in order to enable the UE 610 and the network to mutually know/inform about the thermal state of the UE 610. The thermal states may be configured with UE capability profiles; at least with a high state capability profile (based on UE category and high performance configuration), a permanent state capability profile (with a configuration that is sustainable in terms of not overheating the device), and a recovery capability profile (with a configuration that allows the device to recover from close to overheating conditions). In certain embodiments, the thermal states can be configured with additional parameters such as the maximum time the UE 610 may stay in the high state.

In certain embodiments, the thermal automaton is a means to standardize network-device interaction for thermal management by requesting that the thermal automatons 620, 622 be maintained both in the UE 610 as well as in the network (e.g., by one or more of the network nodes 612, 614). In certain embodiments, a configurable but defined set of UE-autonomous state transitions have the consent of the network. In addition, or in other embodiments, the UE 610 signals to the network its autonomous transitions via a PPI bit. In other embodiments, the UE 610 signals to the network its autonomous transitions via a PPI word. In addition, or in other embodiments, it is possible to intercept the thermal automaton 620 by AT command.

In certain embodiments, the wireless network-device system 600 may perform thermal automaton state transitions based on applications or services. In addition, or in other embodiments, pre-scheduled thermal state sequence and/or large-scale DTX allow for a specification of fixed semi-persistent thermal sequences to avoid emergency situations in extreme applications.

In certain embodiments, a subset of network-device interaction schemes is part of the conformance test requirements for UE categories, for example, above Cat-7. In certain such embodiments, UE Categories above Cat-7 are amended with the appropriate conformance test conditions.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
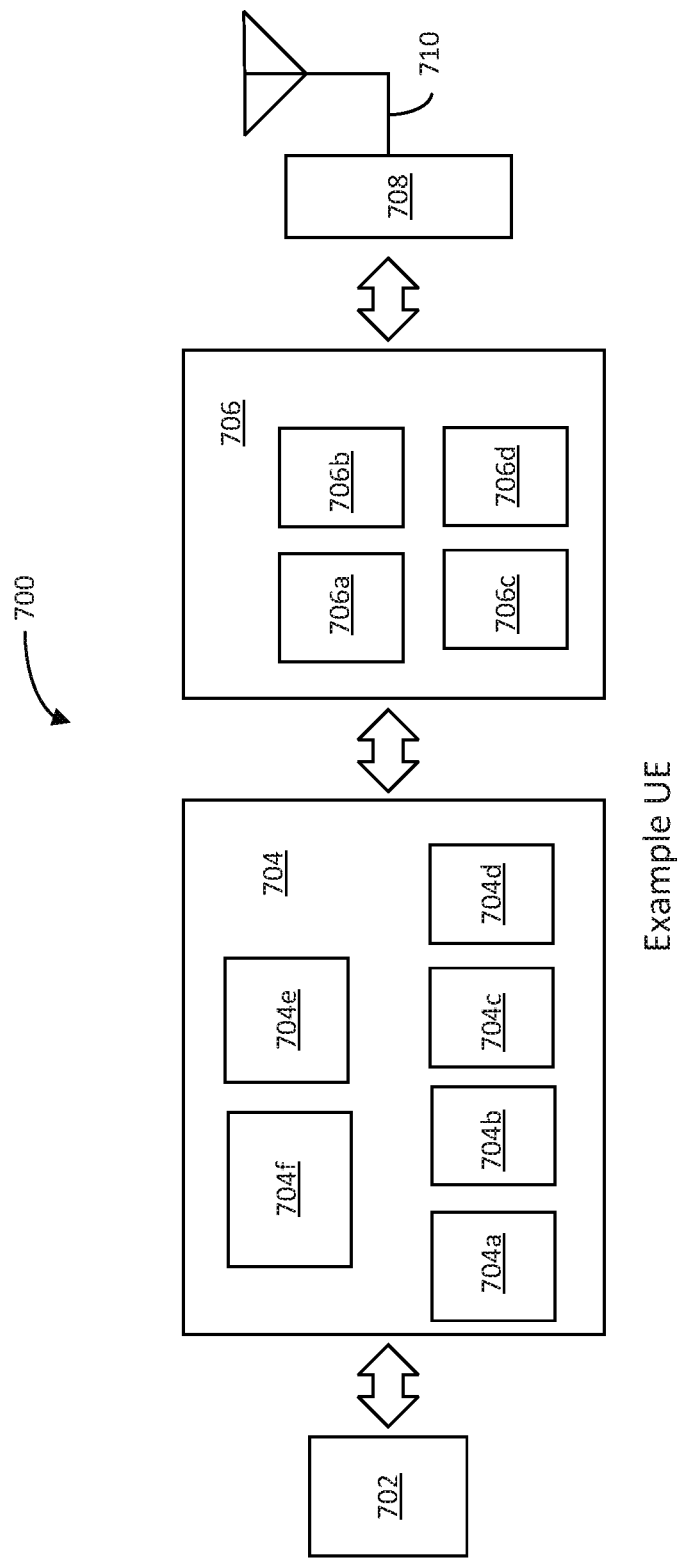
FIG. 7 illustrates, for one embodiment, example components of a UE device.

Embodiments described herein may be implemented into a system using any suitably configured hardware and/or software. FIG. 7 illustrates, for one embodiment, example components of a UE device 700. In some embodiments, the UE device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations or generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP, and/or RRC layers. In some embodiments, the baseband circuitry 704 may include one or more audio digital signal processor(s) (DSP) 704f. The audio DSP(s) 704f may include elements for compression/decompression and echo cancellation and may include other suitable processing elements in other embodiments. Components of the baseband circuitry 704 may be suitably combined in a single chip or single chipset, or disposed on a same circuit board in some embodiments. In some embodiments, some or all of the constituent components of the baseband circuitry 704 and the application circuitry 702 may be implemented together, such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc., to facilitate the communication with the wireless network. RF circuitry 706 may include a receive signal path, which may include circuitry to down-convert RF signals received from the FEM circuitry 708 and provide baseband signals to the baseband circuitry 704. RF circuitry 706 may also include a transmit signal path, which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b, and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals, and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 706 may include analog-to-digital converter (ADC) and digital-to-analog converter (DAC) circuitry, and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect, as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702, depending on the desired output frequency. In some embodiments, a divider control input (e.g., N) may be determined from a look-up table based on a channel indicated by the application circuitry 702.

Synthesizer circuitry 706d of the RF circuitry 706 may include a divider, a delay-locked loop (DLL), a multiplexer, and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from one or more antennas 710, amplify the received signals, and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The receive signal path of the FEM 708 circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the UE device 700 may include additional elements, such as, for example, memory/storage, a display, a camera, a sensor, and/or an input/output (I/O) interface.

Examples

The following examples pertain to further embodiments.

Example 1 is a user equipment (UE) including a transceiver and a thermal finite-state-automaton. The transceiver is to communicate through a wireless communication system. The thermal finite-state-automaton includes logic, at least a portion of which includes circuitry. The thermal finite-state-automaton includes a plurality of system states and transitions between the plurality of system states. One or more of the plurality of system states is based on a combination of network parameters for communicating through the wireless communication system and UE processing parameters. The plurality of system states include a default state, a high state, a recovery state, and an emergency shutdown state. The default state is for operation of the UE at a sustainable performance configuration level for the network parameters and the UE processing parameters to maintain a UE temperature below a first temperature threshold. The high state is for operation of the UE during up to a maximum time duration at a peak performance configuration level for the network parameters and the UE processing parameters. The performance configuration level exceeds the sustainable performance configuration level. The recovery state is for operation of the UE during at least a minimum time duration at a reduced performance configuration level for the network parameters and the UE processing parameters. The reduced performance configuration level is less than the sustainable performance configuration level. The emergency shutdown state is triggerable by the UE temperature exceeding a second temperature threshold.

Example 2 includes the UE of Example 1, wherein the network parameters include one or more parameters selected from a group comprising a modulation type, a coding scheme, a UE category, an uplink data rate, and a downlink data rate.

Example 3 includes the UE of any of Examples 1-2, and further includes a system on chip (SoC), wherein the UE processing parameters include one or more parameters selected from a group comprising ambient temperature, system temperature of the SoC, junction temperature of the SoC, printed circuit board (PCB) temperature of the SoC, UE front or back skin temperature, UE internal case temperature, processing frequency of the SoC, number of activated power domains in the SoC, SoC current levels, SoC voltage levels, SoC chip process information, and SoC thermal budget.

Example 4 includes the UE of any of Examples 1-3, wherein at least one of the default state, the high state, and the recovery state is based on a UE category associated with the UE.

Example 5 includes the UE of any of Examples 1-4, wherein the UE is configured to communicate a UE capability profile through the transceiver to a node in the wireless communication system to configure one or more of the plurality of system states. The UE capability profile including one or more of: a default state capability profile to configure one or more of the network parameters and the UE processing parameters to maintain the UE temperature below the first temperature threshold; a high state capability profile to configure one or more of the network parameters and the UE processing parameters to operate at the peak performance configuration level; and a recovery capability profile to configure one or more of the network parameters and the UE processing parameters to prevent the UE temperature from exceeding the second temperature threshold.

Example 6 includes the UE of Example 5, wherein the node comprises an evolved universal terrestrial radio access network (E-UTRAN) Node B (eNB) in a third generation partnership project (3GPP) network, and wherein the UE is configured to signal the UE capability profile upon attachment to the eNB.

Example 7 includes the UE of any of Examples 5-6, wherein at least one of the network parameters and the UE processing parameters may be further configured by a user or the wireless communication system to select one or more of the first temperature threshold, the maximum time duration, the minimum time duration, the second temperature threshold, and a presumed ambient temperature.

Example 8 includes the UE of Example any of Examples 1-7, wherein the UE is configured to autonomously transition between one or more of the plurality of system states without first being reconfigured by the wireless communication network.

Example 9 includes the UE of Example 8, wherein the UE is configured to signal, through the transceiver to the wireless communication system, a change in a power preference indicator (PPI) bit upon an autonomous transition from the high state to the emergency shutdown state before the maximum time duration lapses, or from the high state to the recovery state after the maximum time duration lapses.

Example 10 includes the UE of Example 8, wherein the plurality of thermal states further comprises: a low state for periodically alternating operation of the UE between the peak performance configuration of the high state and a lower performance configuration level; and one or more emergency states in addition to the emergency shutdown state. Further, the UE is configured to signal, through the transceiver to the wireless communication system using a plurality of power preference indicator (PPI) bits, an indication of an autonomous transition from the high state to one of the other plurality of system states.

Example 11 includes the UE of Example 10, wherein the one or more emergency states in addition to the emergency shutdown state comprises an emergency transition to the recovery state to enable cool-down of the UE for a selected period of time until the network reconfigures the UE in the recovery state.

Example 12 includes the UE of any of Examples 1-7, wherein the UE is configured to transition between one or more of the plurality of system states in response to being reconfigured by the wireless communication network, another UE in a device-to-device (D2D) context, or a user command.

Example 13 includes the UE of any of Examples 1-12, wherein the UE is configured to transition between one or more of the plurality of system states based on a detected event, a selected application for execution by the UE, or a selected service provided by the wireless communication network.

Example 14 includes the UE of Example 13, wherein the UE is further configured to transition between one or more of the plurality of system states according to a pre-scheduled thermal state sequence or extended discontinuous transmission mode associated with the detected event, the selected application, or the selected service.

Example 15 includes the UE of any of Examples 1-14, wherein a subset of interactions between the wireless communication system and the UE to indicate or cause a transition between one or more of the plurality of system states is included as a conformance test requirement for a UE category corresponding to the UE, and wherein during a conformance test of the UE, corresponding test conditions are implemented for one or more combinations of the network parameters and the UE processing parameters to confirm that the subset of interactions satisfy the conformance test requirement for the UE category.

Example 16 is a node in a mobile communication network. The node includes one or more processors and at least one computer-readable storage medium having stored thereon instructions that, when executed by the one or more processors, cause the one or more processors to perform operations. The operations include: receive, from a user equipment (UE), a UE capability profile comprising a plurality of sets of network parameters for communicating with the UE in corresponding thermal system states; select a first set from among the plurality of sets of network parameters corresponding to a current thermal system state of the UE; and configure the UE for communication through the mobile communication network based on the first set.

Example 17 includes the node of Example 16, wherein the network parameters include one or more parameters selected from a group comprising a modulation type, a coding scheme, a UE category, an uplink data rate, and a downlink data rate.

Example 18 includes the node of any of Examples 16-17, wherein the operations further include determine the current thermal system state based on a single bit received from the UE and a timer associated with a previous thermal system state.

Example 19 includes the node of Example 18, wherein the single bit comprises a power preference indicator (PPI) bit in a long term evolution (LTE) system.

Example 20 includes the node of Example 19, wherein the operations further include determine, based on the PPI bit and a high state timer that has not elapsed, that the UE has autonomously transitioned from a high state to an emergency shutdown state.

Example 21 includes the node of Example 19, wherein the operations further include determine, based on the PPI bit and an elapsed high state timer, that the UE has autonomously transitioned from a high state to a recovery state.

Example 22 includes the node of any of Examples 16-21, wherein the UE capability profile comprises at least a default state profile, a high state profile, and a recovery state profile.

Example 23 includes the node of Example 22, wherein the operations further include determine the current thermal system state based on a plurality of bits received from the UE, wherein the UE capability profile further comprises one or more of a low state profile and an emergency transit to recover state profile.

Example 24 includes the node of Example 22, wherein the operations further include selectively configure at least one of a high state timer value associated with the high state profile and a recovery timer associated with the recovery state profile.

Example 25 is a user equipment (UE) that includes a radio frequency (RF) circuitry to wireless communicate with a network, and a system on chip (SoC) configured to transition the UE between a plurality of thermal system states. The transitions are based on: network parameters for communication with the network through the RF circuitry, the network parameters comprising at least a modulation type and coding scheme; and SoC parameters comprising at least a system temperature of the SoC.

Example 26 includes the UE of Example 25, wherein the network parameters further comprise a UE category, and wherein the SoC parameters further include one or more parameters selected from a group comprising junction temperature of the SoC, printed circuit board (PCB) temperature of the SoC, processing frequency of the SoC, number of activated power domains in the SoC, SoC current levels, SoC voltage levels, SoC chip process information, and SoC thermal budget.

Example 27 is a method to reduce or prevent overheating of a user equipment (UE), comprising: transitioning a thermal state machine between a plurality of system states including at least a default state, a high state, a recovery state, and an emergency shutdown state, the plurality of system states based on a combination of network parameters for communicating through a wireless network and UE processing parameters; operating the UE in the default state at a sustainable performance configuration level for the network parameters and the UE processing parameters to maintain a UE temperature below a first temperature threshold; operating the UE in the high state for up to a maximum time duration at a peak performance configuration level for the network parameters and the UE processing parameters, the peak performance configuration level to exceed the sustainable performance configuration level; operating the UE in the recovery state for at least a minimum time duration at a reduced performance configuration level for the network parameters and the UE processing parameters, the reduced performance configuration level being less than the sustainable performance configuration level; and operating the UE in the emergency shutdown state triggerable by the UE temperature exceeding a second temperature threshold.

Example 28 includes the method of Example 27, further comprising selecting the network parameters from a group comprising a modulation type, a coding scheme, a UE category, an uplink data rate, and a downlink data rate.

Example 29 includes the method of any of Examples 27-28, further comprising selecting the UE processing parameters from a group comprising ambient temperature, system temperature of a system on chip (SoC), junction temperature of the SoC, printed circuit board (PCB) temperature of the SoC, UE front or back skin temperature, UE internal case temperature, processing frequency of the SoC, number of activated power domains in the SoC, SoC current levels, SoC voltage levels, SoC chip process information, and SoC thermal budget.

Example 30 includes the method of any of Examples 27-29, further comprising configuring at least one of the default state, the high state, and the recovery state based on a UE category associated with the UE.

Example 31 includes the method of any of Examples 27-30, and further includes communicating a UE capability profile to a node in the wireless network to configure one or more of the plurality of system states. The UE capability profile comprises one or more of: a default state capability profile to configure one or more of the network parameters and the UE processing parameters to maintain the UE temperature below the first temperature threshold; a high state capability profile to configure one or more of the network parameters and the UE processing parameters to operate at the peak performance configuration level; and a recovery capability profile to configure one or more of the network parameters and the UE processing parameters to prevent the UE temperature from exceeding the second temperature threshold.

Example 32 includes the method of Example 31, wherein the node comprises an evolved universal terrestrial radio access network (E-UTRAN) Node B (eNB) in a third generation partnership project (3GPP) network, and wherein the method further comprises signaling the UE capability profile upon attachment to the eNB.

Example 33 includes the method of any of Examples 31-32, and further includes receiving an attention (AT) command from a user or the wireless network, and in response to the AT command, configuring at least one of the network parameters and the UE processing parameters to select one or more of the first temperature threshold, the maximum time duration, the minimum time duration, the second temperature threshold, and a presumed ambient temperature.

Example 34 includes the method of any of Examples 27-33, and further includes autonomously transitioning the thermal state machine between one or more of the plurality of system states without first being authorized by the wireless communication network.

Example 35 includes the method of Example 34, and further includes signaling, to the wireless network, a change in a power preference indicator (PPI) bit upon an autonomous transition from the high state to the emergency shutdown state before the maximum time duration lapses, or from the high state to the recovery state after the maximum time duration lapses.

Example 36 includes the method of Example 34, wherein the plurality of thermal states further comprises a low state. The method further includes: periodically alternating operation of the UE between the peak performance configuration of the high state and a lower performance configuration level of the low state; and signaling, to the wireless network using a plurality of power preference indicator (PPI) bits, an indication of an autonomous transition from the high state to one of the other plurality of system states.

Example 37 includes the method of Example 36, and further includes performing an emergency transition to the recovery state to enable cool-down of the UE for a selected period of time until the network reconfigures the UE in the recovery state.

Example 38 includes the method of any of Examples 27-33, and further includes transitioning between one or more of the plurality of system states in response to being reconfigured by the wireless network, another UE in a device-to-device (D2D) context, or a user command.

Example 39 includes the method of any of Examples 27-38, and further includes transitioning between one or more of the plurality of system states based on a detected event, a selected application for execution by the UE, or a selected service provided by the wireless communication network.

Example 40 includes the method of Example 39, and further includes transitioning between one or more of the plurality of system states according to a pre-scheduled thermal state sequence or extended discontinuous transmission mode associated with the detected event, the selected application, or the selected service.

Example 41 includes the method of any of Examples 27-40, and further includes: defining a subset of interactions between the wireless network and the UE to indicate or cause a transition between one or more of the plurality of system states; including the subset of interactions as a conformance test requirement for a UE category corresponding to the UE; and during a conformance test of the UE, implementing test conditions for one or more combinations of the network parameters and the UE processing parameters to confirm that the subset of interactions satisfy the conformance test requirement for the UE category.

Example 42 is a method for a node in a mobile communication network. The method includes: receiving, from a user equipment (UE), a UE capability profile comprising a plurality of sets of network parameters for communicating with the UE in corresponding thermal system states; selecting a first set from among the plurality of sets of network parameters corresponding to a current thermal system state of the UE; and configuring the UE for communication through the mobile communication network based on the first set.

Example 43 includes the method of Example 42, further comprising selecting the network parameters from a group comprising a modulation type, a coding scheme, a UE category, an uplink data rate, and a downlink data rate.

Example 44 includes the method of any of Examples 42-43, further comprising determining the current thermal system state based on a single bit received from the UE and a timer associated with a previous thermal system state.

Example 45 includes the method of Example 44, wherein the single bit comprises a power preference indicator (PPI) bit in a long term evolution (LTE) system.

Example 46 includes the method of Example 45, further comprising determining, based on the PPI bit and a high state timer that has not elapsed, that the UE has autonomously transitioned from a high state to an emergency shutdown state.

Example 47 includes the method of Example 45, further comprising determining, based on the PPI bit and an elapsed high state timer, that the UE has autonomously transitioned from a high state to a recovery state.

Example 48 includes the method of any of Examples 42-47, wherein the UE capability profile comprises at least a default state profile, a high state profile, and a recovery state profile.

Example 49 includes the method of Example 48, further comprising determining the current thermal system state based on a plurality of bits received from the UE, wherein the UE capability profile further comprises one or more of a low state profile and an emergency transit to recover state profile.

Example 50 includes the method of Example 48, further comprising selectively configuring at least one of a high state timer value associated with the high state profile and a recovery timer associated with the recovery state profile.

Example 51 is a method for a user equipment (UE) to communicate with a network. The method includes: transitioning the UE between a plurality of thermal system states based on: network parameters for communication with the network, the network parameters comprising at least a modulation type and coding scheme; and system on chip (SoC) parameters of the UE, the SoC parameters comprising at least a system temperature of the SoC.

Example 52 includes the method of Example 51, wherein the network parameters further comprise a UE category, and wherein the method further comprises selecting the SoC parameters from a group comprising junction temperature of the SoC, printed circuit board (PCB) temperature of the SoC, processing frequency of the SoC, number of activated power domains in the SoC, SoC current levels, SoC voltage levels, SoC chip process information, and SoC thermal budget.

Example 53 is at least one computer-readable storage medium having stored thereon computer-readable instructions, when executed, to implement a method as recited in any of Examples 27-52.

Example 54 is an apparatus comprising means to perform a method as recited in any of Examples 27-52.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) comprising:
   a transceiver to communicate through a wireless communication system;
   a thermal finite-state-automaton comprising logic, at least a portion of which includes circuitry, the thermal finite-state-automaton comprising a plurality of system states and transitions between the plurality of system states, one or more of the plurality of system states based on a combination of network parameters for communicating through the wireless communication system and UE processing parameters, the plurality of system states comprising:
      a default state for operation of the UE at a sustainable performance configuration level for the network parameters and the UE processing parameters to maintain a UE temperature below a first temperature threshold;
      a high state for operation of the UE during up to a maximum time duration at a peak performance configuration level for the network parameters and the UE processing parameters, the peak performance configuration level to exceed the sustainable performance configuration level;
      a recovery state for operation of the UE during at least a minimum time duration at a reduced performance configuration level for the network parameters and the UE processing parameters, the reduced performance configuration level being less than the sustainable performance configuration level; and
      an emergency shutdown state triggerable by the UE temperature exceeding a second temperature threshold,
   wherein the UE is configured to autonomously transition between one or more of the plurality of system states without first being reconfigured by the wireless communication network, and
   wherein the UE is configured to signal, through the transceiver to the wireless communication system, a change in a power preference indicator (PPI) bit upon an autonomous transition from the high state to the emergency shutdown state before the maximum time duration lapses, or from the high state to the recovery state after the maximum time duration lapses.

2. The UE of claim 1, wherein the network parameters include one or more parameters selected from a group comprising a modulation type, a coding scheme, a UE category, an uplink data rate, and a downlink data rate.

3. The UE of claim 1, further comprising a system on chip (SoC), wherein the UE processing parameters include one or more parameters selected from a group comprising ambient temperature, system temperature of the SoC, junction temperature of the SoC, printed circuit board (PCB) temperature of the SoC, UE front or back skin temperature, UE internal case temperature, processing frequency of the SoC, number of activated power domains in the SoC, SoC current levels, SoC voltage levels, SoC chip process information, and SoC thermal budget.

4. The UE of claim 1, wherein at least one of the default state, the high state, and the recovery state is based on a UE category associated with the UE.

5. The UE of claim 1, wherein the UE is configured to communicate a UE capability profile through the transceiver to a node in the wireless communication system to configure one or more of the plurality of system states, the UE capability profile comprising one or more of:

a default state capability profile to configure one or more of the network parameters and the UE processing parameters to maintain the UE temperature below the first temperature threshold;

a high state capability profile to configure one or more of the network parameters and the UE processing parameters to operate at the peak performance configuration level; and a recovery capability profile to configure one or more of the network parameters and the UE processing parameters to prevent the UE temperature from exceeding the second temperature threshold.

6. The UE of claim 5, wherein the node comprises an evolved universal terrestrial radio access network (E-UTRAN) Node B (eNB) in a third generation partnership project (3GPP) network, and wherein the UE is configured to signal the UE capability profile upon attachment to the eNB.

7. The UE of claim 5, wherein at least one of the network parameters and the UE processing parameters may be further configured by a user or the wireless communication system to select one or more of the first temperature threshold, the maximum time duration, the minimum time duration, the second temperature threshold, and a presumed ambient temperature.

8. The UE of claim 1, wherein the plurality of thermal states further comprises:

a low state for periodically alternating operation of the UE between the peak performance configuration of the high state and a lower performance configuration level; and one or more emergency states in addition to the emergency shutdown state, and wherein the UE is configured to signal, through the transceiver to the wireless communication system using a plurality of power preference indicator (PPI) bits, an indication of an autonomous transition from the high state to one of the other plurality of system states.

9. The UE of claim 8, wherein the one or more emergency states in addition to the emergency shutdown state comprises an emergency transition to the recovery state to enable cool-down of the UE for a selected period of time until the network reconfigures the UE in the recovery state.

10. The UE of claim 1, wherein the UE is configured to transition between one or more of the plurality of system states in response to being reconfigured by the wireless communication network, another UE in a device-to-device (D2D) context, or a user command.

11. The UE of claim 1, wherein the UE is configured to transition between one or more of the plurality of system states based on a detected event, a selected application for execution by the UE, or a selected service provided by the wireless communication network.

12. The UE of claim 11, wherein the UE is further configured to transition between one or more of the plurality of system states according to a pre-scheduled thermal state sequence or extended discontinuous transmission mode associated with the detected event, the selected application, or the selected service.

13. The UE of claim 1, wherein a subset of interactions between the wireless communication system and the UE to indicate or cause a transition between one or more of the plurality of system states is included as a conformance test requirement for a UE category corresponding to the UE, and wherein during a conformance test of the UE, corresponding test conditions are implemented for one or more combinations of the network parameters and the UE processing parameters to confirm that the subset of interactions satisfy the conformance test requirement for the UE category.

14. A user equipment (UE) comprising:

a transceiver to communicate through a wireless communication system;

a thermal finite-state-automaton comprising logic, at least a portion of which includes circuitry, the thermal finite-state-automaton comprising a plurality of system states and transitions between the plurality of system states, one or more of the plurality of system states based on a combination of network parameters for communicating through the wireless communication system and UE processing parameters, the plurality of system states comprising:

a default state for operation of the UE at a sustainable performance configuration level for the network parameters and the UE processing parameters to maintain a UE temperature below a first temperature threshold;

a high state for operation of the UE during up to a maximum time duration at a peak performance configuration level for the network parameters and the UE processing parameters, the peak performance configuration level to exceed the sustainable performance configuration level;

a recovery state for operation of the UE during at least a minimum time duration at a reduced performance configuration level for the network parameters and the UE processing parameters, the reduced performance configuration level being less than the sustainable performance configuration level;

an emergency shutdown state triggerable by the UE temperature exceeding a second temperature threshold;

a low state for periodically alternating operation of the UE between the peak performance configuration of the high state and a lower performance configuration level; and one or more emergency states in addition to the emergency shutdown state, wherein the UE is configured to autonomously transition between one or more of the plurality of system states without first being reconfigured by the wireless communication network, and wherein the UE is configured to signal, through the transceiver to the wireless communication system using a plurality of power preference indicator (PPI) bits, an indication of an autonomous transition from the high state to one of the other plurality of system states.

15. The UE of claim 14, wherein the network parameters include one or more parameters selected from a group comprising a modulation type, a coding scheme, a UE category, an uplink data rate, and a downlink data rate.

16. The UE of claim 14, further comprising a system on chip (SoC), wherein the UE processing parameters include one or more parameters selected from a group comprising ambient temperature, system temperature of the SoC, junction temperature of the SoC, printed circuit board (PCB) temperature of the SoC, UE front or back skin temperature, UE internal case temperature, processing frequency of the SoC, number of activated power domains in the SoC, SoC current levels, SoC voltage levels, SoC chip process information, and SoC thermal budget.

17. The UE of claim 14, wherein at least one of the default state, the high state, and the recovery state is based on a UE category associated with the UE.

18. The UE of claim 14, wherein the UE is configured to communicate a UE capability profile through the transceiver to a node in the wireless communication system to configure one or more of the plurality of system states, the UE capability profile comprising one or more of:
- a default state capability profile to configure one or more of the network parameters and the UE processing parameters to maintain the UE temperature below the first temperature threshold;
- a high state capability profile to configure one or more of the network parameters and the UE processing parameters to operate at the peak performance configuration level; and
- a recovery capability profile to configure one or more of the network parameters and the UE processing parameters to prevent the UE temperature from exceeding the second temperature threshold.

19. The UE of claim 18, wherein the node comprises an evolved universal terrestrial radio access network (E-UTRAN) Node B (eNB) in a third generation partnership project (3GPP) network, and wherein the UE is configured to signal the UE capability profile upon attachment to the eNB.

20. The UE of claim 18, wherein at least one of the network parameters and the UE processing parameters may be further configured by a user or the wireless communication system to select one or more of the first temperature threshold, the maximum time duration, the minimum time duration, the second temperature threshold, and a presumed ambient temperature.

21. The UE of claim 14, wherein the one or more emergency states in addition to the emergency shutdown state comprises an emergency transition to the recovery state to enable cool-down of the UE for a selected period of time until the network reconfigures the UE in the recovery state.

22. The UE of claim 14, wherein the UE is configured to transition between one or more of the plurality of system states in response to being reconfigured by the wireless communication network, another UE in a device-to-device (D2D) context, or a user command.

23. The UE of claim 14, wherein the UE is configured to transition between one or more of the plurality of system states based on a detected event, a selected application for execution by the UE, or a selected service provided by the wireless communication network.

24. The UE of claim 23, wherein the UE is further configured to transition between one or more of the plurality of system states according to a pre-scheduled thermal state sequence or extended discontinuous transmission mode associated with the detected event, the selected application, or the selected service.

* * * * *